United States Patent
Home (10) Patent No.: US 7,360,783 B2
(45) Date of Patent: Apr. 22, 2008

(54) BARBECUE DEVICE HAVING FOLDABLE CART

(75) Inventor: William Home, Taipei (TW)

(73) Assignee: Grand Hall Enterprise Co., Ltd., Taipei (TW)

( * ) Notice: Subject to any disclaimer, the term of this patent is extended or adjusted under 35 U.S.C. 154(b) by 137 days.

(21) Appl. No.: 11/321,866

(22) Filed: Dec. 30, 2005

(65) Prior Publication Data
US 2007/0152414 A1    Jul. 5, 2007

(51) Int. Cl.
*B62B 3/02* (2006.01)

(52) U.S. Cl. .................. 280/639; 280/38; 211/195; 312/258

(58) Field of Classification Search ........... 280/639, 280/640, 37, 38, 651, 39, 641, 42, 647; 312/258, 312/257.1; 211/195, 200, 201
See application file for complete search history.

(56) References Cited

U.S. PATENT DOCUMENTS

| | | | | |
|---|---|---|---|---|
| 3,966,286 A | * | 6/1976 | Groseclose | ................. 312/258 |
| 4,236,460 A | * | 12/1980 | Poupko | ........................ 108/41 |
| 5,375,294 A | * | 12/1994 | Garrett | ........................... 16/34 |
| 6,267,393 B1 | * | 7/2001 | Mengrone et al. | ............ 280/37 |
| 6,733,026 B1 | * | 5/2004 | Robberson et al. | ...... 280/415.1 |
| 6,845,991 B1 | * | 1/2005 | Ritucci et al. | ................ 280/30 |
| 6,851,564 B2 | * | 2/2005 | Ng | ............................. 211/149 |
| 7,118,115 B2 | * | 10/2006 | Abel | ....................... 280/43.13 |
| 2005/0217071 A1 | * | 10/2005 | Shinner | ........................ 16/19 |
| 2005/0279341 A1 | * | 12/2005 | Chung | ....................... 126/9 R |

* cited by examiner

*Primary Examiner*—Christopher P. Ellis
*Assistant Examiner*—John D Walters
(74) *Attorney, Agent, or Firm*—Leong C. Lei (57) ABSTRACT

A barbecue device having a brazier positioned on a cubic cart is provided. The cart contains a bottom board with a number of wheels, a pair of side boards, a back board, and doors. Four joint elements are configured at the four corners on the top surface of the bottom board pin-joined to the side boards. A side board therefore can be folded down towards the bottom board. Four C-shaped seat elements are configured at the four corners on the bottom surface of the bottom board to pin-joined to the axle elements of the wheels. A wheel and its axle element therefore can be folded towards the bottom board.

4 Claims, 7 Drawing Sheets

BARBECUE DEVICE HAVING FOLDABLE CART

BACKGROUND OF THE INVENTION (a) Technical Field of the Invention

The present invention generally relates to barbecue devices, and more particularly to a barbecue device having a foldable, toll-around cart.

(b) Description of the Prior Art

Barbecue has been one of the most popular outdoor activities for people of all ages. Various types of barbecue devices are therefore provided, providing more convenience for people's usage. A common type of barbecue devices is one having the brazier positioned on top of a roll-around cart.

Most of the roll-around carts have a simple, open frame structure that can be collapsed into a smaller form factor for easier storage and transportation. However, for most of the roll-around carts offering a closed closet, they do not have this kind of convenience. In addition, for all roll-around carts, their wheels are often not foldable, or they can only be screwed loosed and removed from the cart entirely. In either case, the wheels either get in the way when the cart is stored or transported, or get lost as the separated wheels are stored separately.

SUMMARY OF THE INVENTION

The primary purpose of the present invention is to provide a barbecue device having a roll-around cart that can be folded into a regular form for convenient storage and transportation.

The barbecue device mainly contains a brazier positioned on a cubic cart which is assembled by a bottom board with a number of wheels, a pair of side boards, a back board, and doors. Four joint elements are configured at the four corners on the top surface of the bottom board. The side boards have two posts along their two lateral sides. Each of the posts is configured such that a join element can be embedded into the bottom of the post. A slot is configured vertically on each of the joint elements so that a pin can penetrate through the post and the embedded joint element to join them together. As such, a side board along with its two posts can be lifted up for an appropriate distance, and then folded down towards the bottom board.

Four C-shaped seat elements are configured at the four corners on the bottom surface of the bottom board, each of which has its opening facing downward to pin-join the axle element of a wheel. The axle element has another pin flexibly and laterally extended from the axle element. When a wheel and its axle element are positioned upright, its pin would automatically spring into a hole of the seat element so that the wheel is locked at this position to support the cart. By bending the wheel hard enough or pressing the pin inward and releasing it from the hole, the wheel and its axle element can be folded towards the bottom board. As the wheel and its axle element are laid flat against the bottom board, its pin would spring automatically into another hole of the seat element so that the wheel is locked at this folded position.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
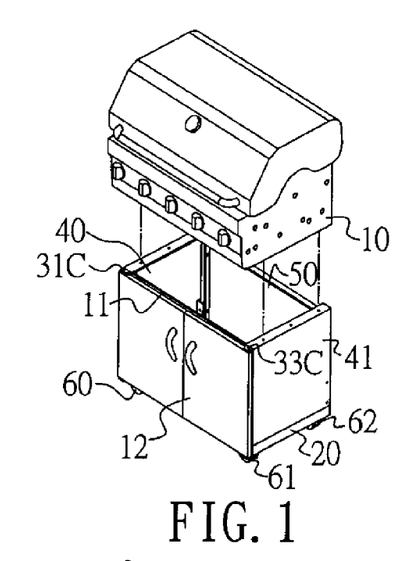
FIG. 1 is a perspective view showing the various components of a barbecue device according to an embodiment of the present invention.

FIG. 1 is a perspective view showing the various components of a barbecue device according to an embodiment of the present invention. As illustrated, the barbecue device mainly contains a brazier 10 positioned on a cubic cart which is assembled by a bottom board 20 with a number of wheels 60, 61, and 62, a pair of side boards 40 ahd 41, a back board 50, and doors 12.

Figure 2:
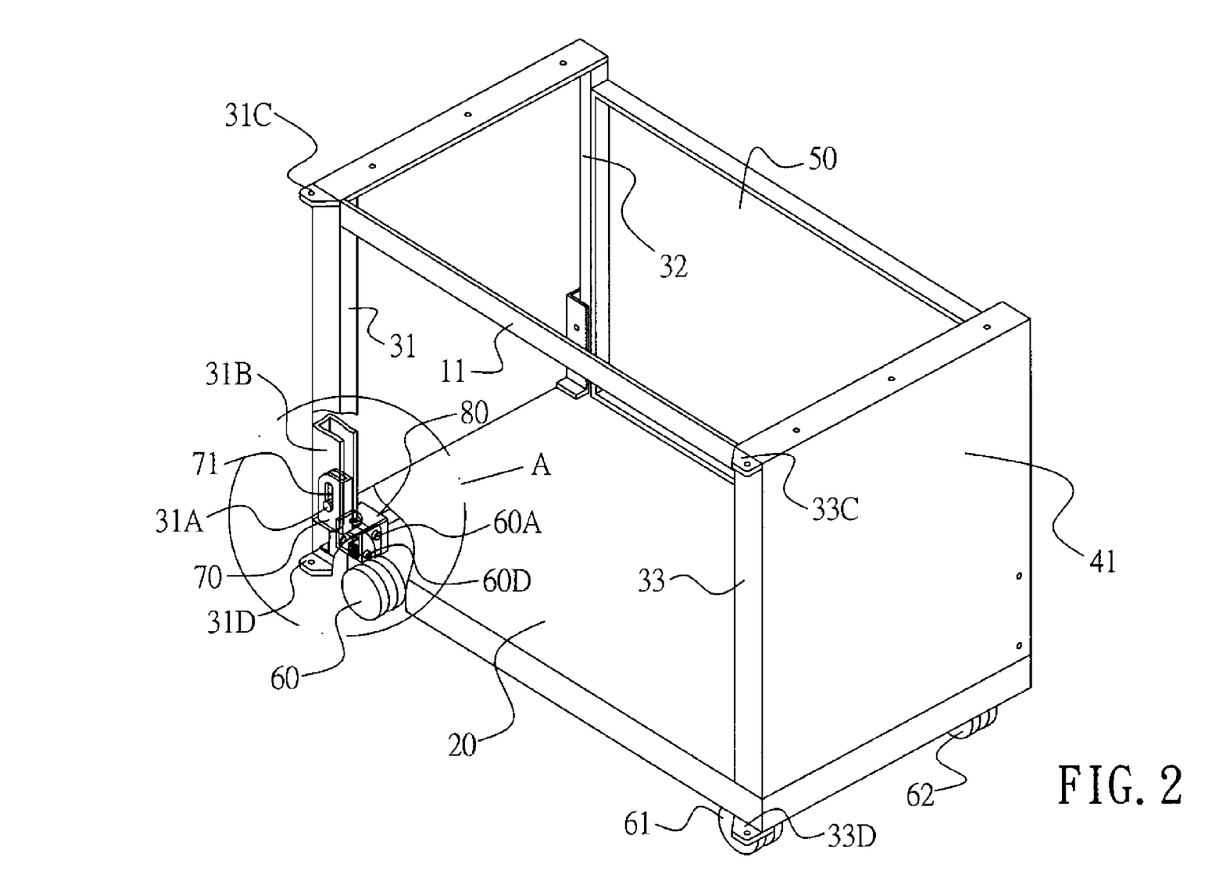
FIG. 2 is a perspective view showing the cart of the barbecue device of FIG. 1.
Figure 3:
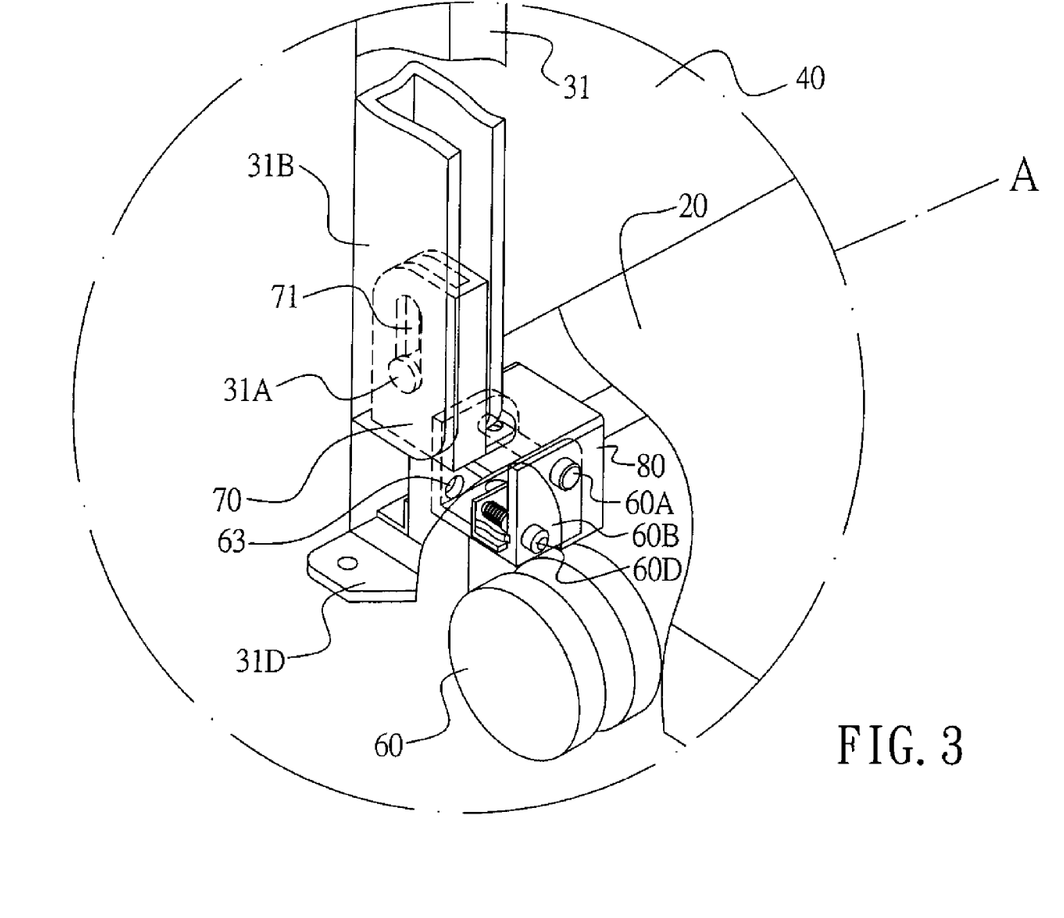
FIG. 3 is an enlarged view showing the assembly details between a post and a joint element of FIG. 2.

FIG. 2 is a perspective view showing the cart of the barbecue device of FIG. 1. As illustrated, four joint elements 70 are configured at the four corners on the top surface of the bottom board 20 respectively. On the other hand, the side boards 40 and 41 have two posts along their two lateral sides. The two posts in the front and at the two sides of the doors 12 are designated with numerals 31 and 33 respectively in the drawings. The other two posts at the back of the cart are designated with a numeral 32. Each of the posts 31, 32, and 33 are configured such that a join element 70 can be embedded into the bottom of the post. In the present embodiment, using the post 31 as an example, a trough 31B facing toward the inside of the cart is configured along the bottom section of the post 31 into which a joint element 70 is embedded. A slot 71 is configured vertically on each of the joint elements 70 and, again using the post 31 as an example, a pin 31A penetrates through the post 31 and the embedded joint element 70 to join them together. As such, the posts 31, 33 and thereby the side board 40 can be lifted up or lowered down vertically within the confinement of the slot 71 and, when the side boards 40 and 41 are lifted up for an appropriate distance, they can be folded down towards the bottom board 20. The details about the connection between the post 31 and the joint element 70 by the pin 31A are provided in FIG. 3.

Figure 4:
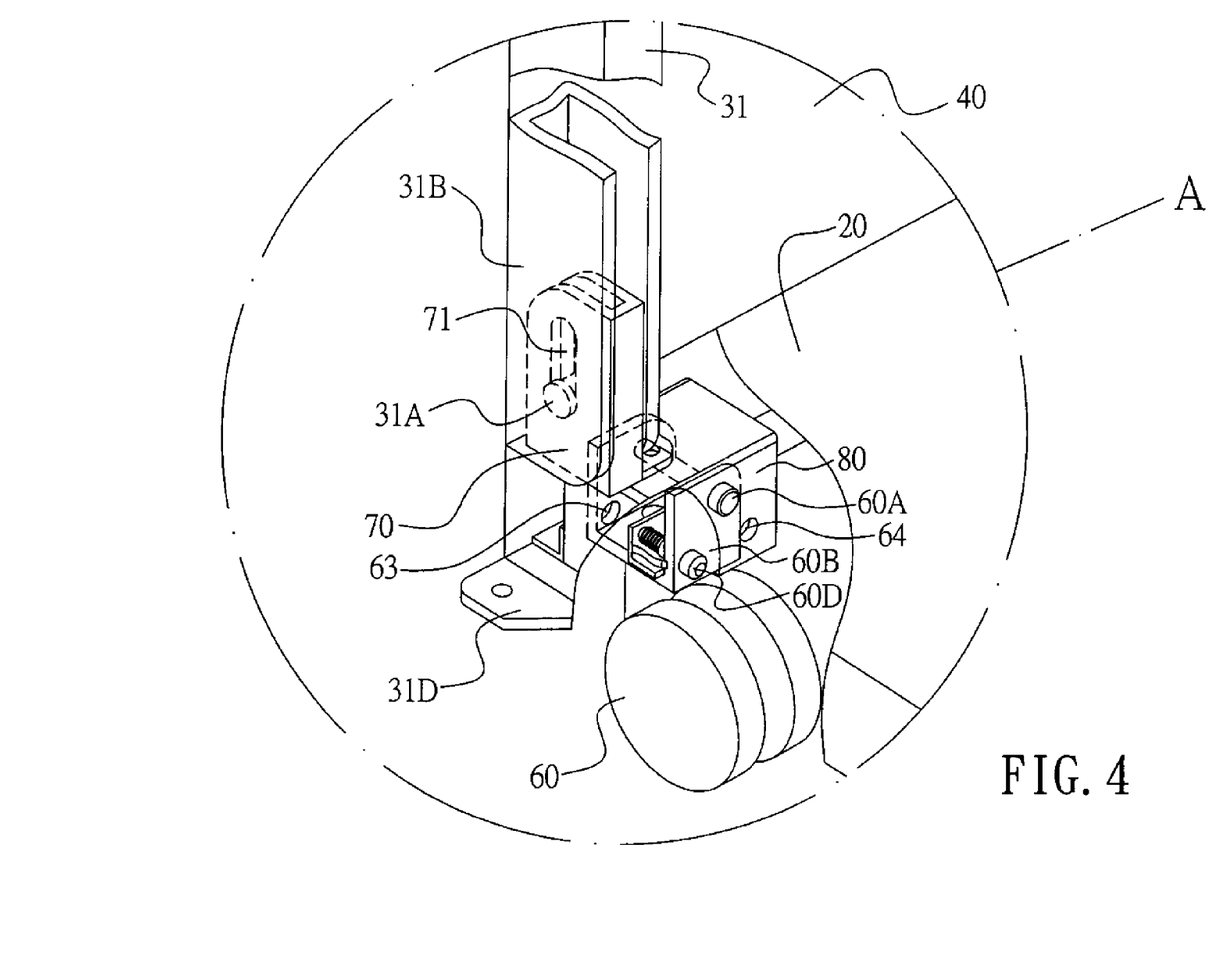
FIG. 4 is an enlarged view showing the details of the configuration of a wheel of FIG. 2.
Figure 5:
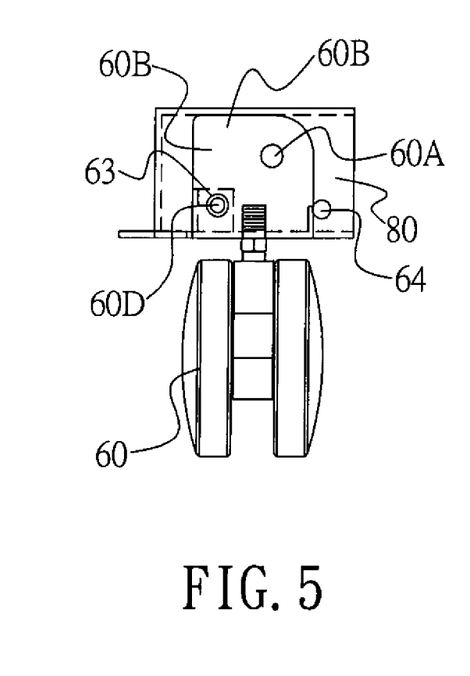
FIG. 5 is a front view showing a wheel of the cart of FIG. 2 when it is locked in an upright position.
Figure 6:
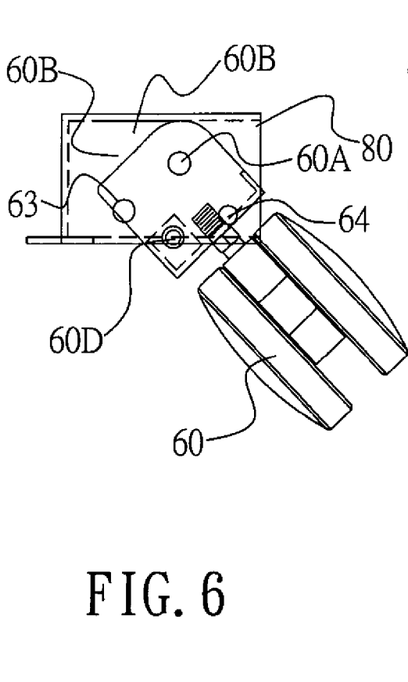
FIG. 6 is a front view showing a wheel of the cart of FIG. 2 when it is folded.
Figure 7:
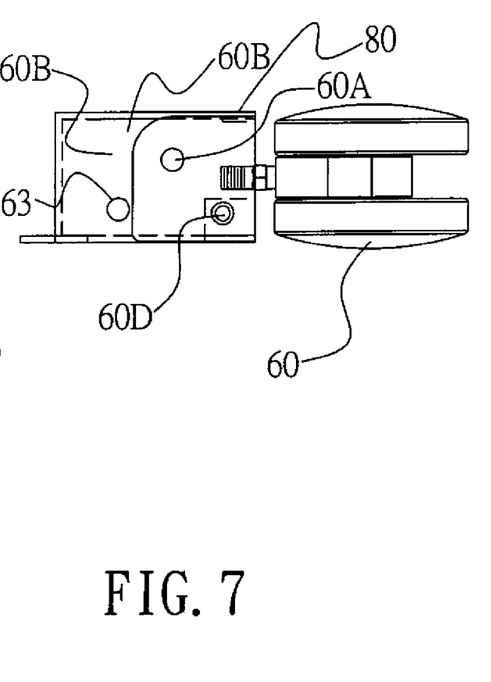
FIG. 7 is a front view showing a wheel of the cart of FIG. 2 when it is locked in a folded position.

FIG. 4 is an enlarged view showing the details of the configuration of a wheel of FIG. 2. As illustrated, four C-shaped seat elements 80 are configured at the four corners on the bottom surface of the bottom boards 20, each of which has its opening facing downward to accommodate an axle element 60B of a wheel 60. In the present embodiment, the axle element 60B is pin-joined to the seat element 80 by a pin 60A so that the wheel 60 along with the axle element 60B can pivot around the pin 60A. The axle element 60B has another pin 60D configured inside parallel to the axis of the wheel 60 and flexibly extended from the axle element 60B. As shown in FIGS. 5~7, when a wheel 60 and its axle element 60B is positioned upright, the pin 60D would automatically spring itself into a hole 63 of the seat element 80 so that the wheel 60 is locked at this position to support the cart. By bending the wheel 60 hard enough or pressing the pin 60D inward and releasing it from the hole 63, the wheel 60 and the axle element 60B can pivot around the pin 60A towards the bottom surface of the bottom board 20. As the wheel 60 and the axle element 60B are laid flat against the bottom board 20, the pin 60D would spring automatically into another hole 64 of the seat element 80 so that the wheel 60 is locked at this position and remains folded this way.

Figure 8:
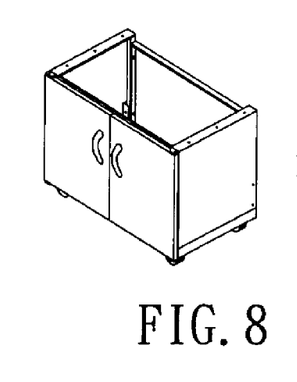
FIG. 8 is a perspective view showing the cart of FIG. 2 after it is assembled.
Figure 9:
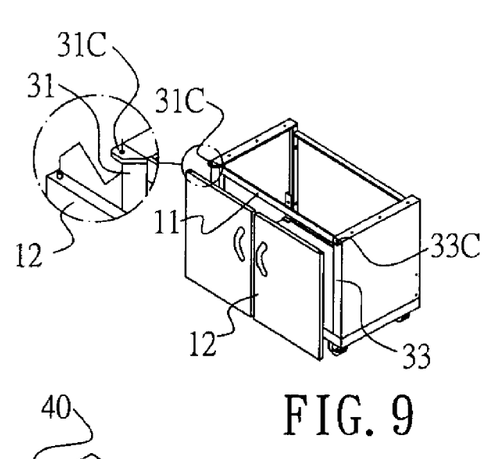
FIG. 9 is a perspective view showing how the doors are hinged to the cart of FIG. 2.
Figure 10:
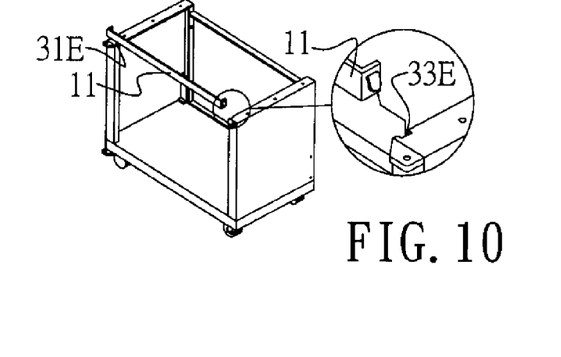
FIG. 10 is a perspective view showing how the transom beam is installed on the cart of FIG. 2.
Figure 11:
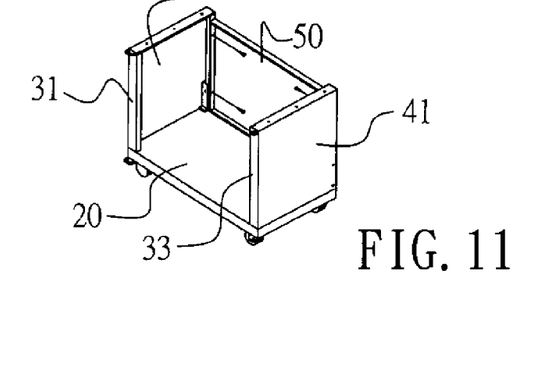
FIG. 11 is a perspective view showing the side boards and back board are initially installed on the cart of FIG. 2.
Figure 12:
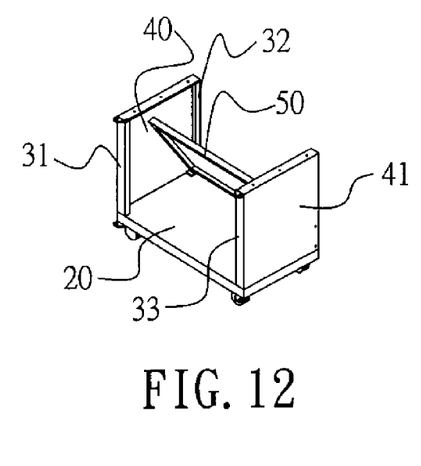
FIGS. 12-20 illustrate how the back board is released from the posts and laid flat on the top of the bottom board.
Figure 13:
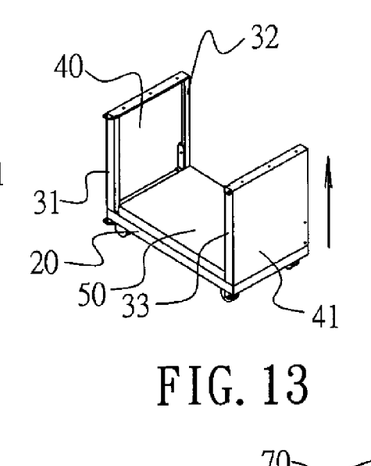
Figure 14:
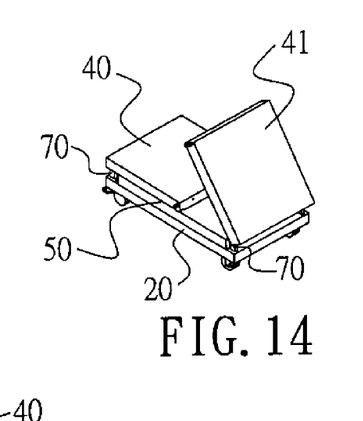
Figure 15:
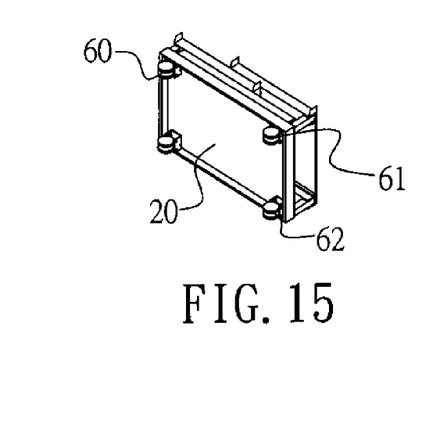
Figure 16:
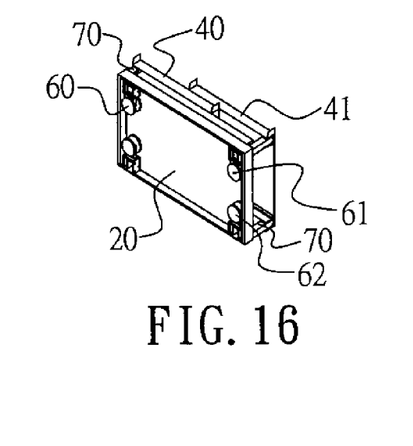
Figure 17:
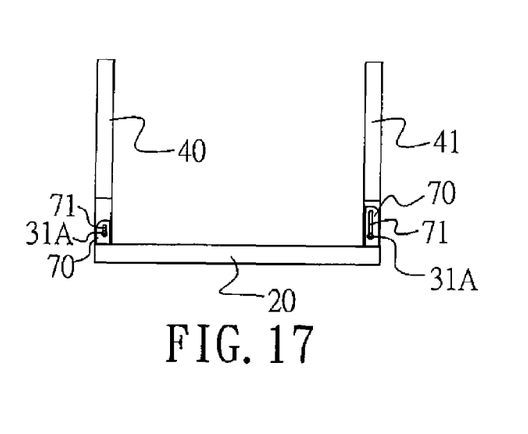
Figure 18:
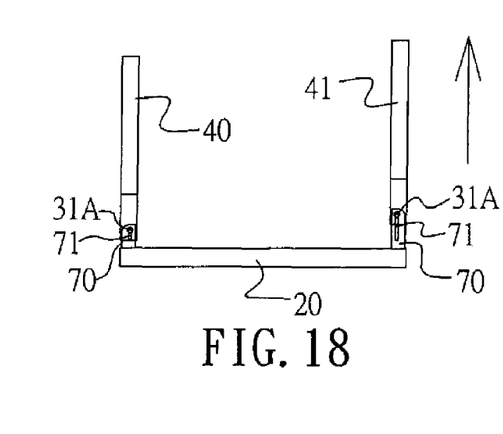
Figures 19, 20:
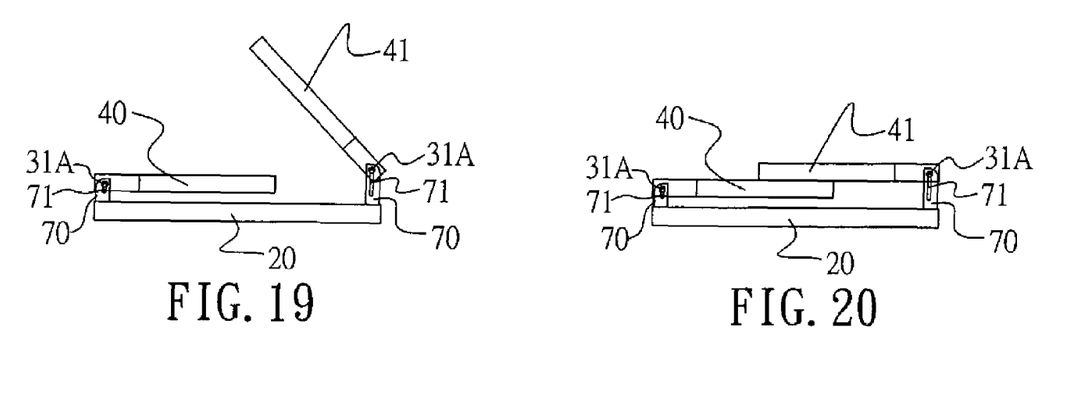

To assemble the cart, as shown in FIG. 11, the side boards 40 and 41 are first erected on the bottom board 20 by having the joint elements 70 inside the respective posts 31, 32, and 33 and having the pints 31A installed. The back board 50 is then installed between the two posts 32 at the back of the cart by an appropriate locking mechanism (not shown). Then, as shown in FIG. 10, the posts 31 and 33 have grooves 31E and 33E configured at their top ends respectively. The grooves 31E and 33E face toward each other so that a lateral transom beam 11 is installed across the side boards 40 and 41. As shown in FIG. 9, two pairs of ears, 31C/31D and 33C/33D, are extended from the top and bottom ends of the two posts 31 and 33 toward the front of the cart respectively. The doors 12 are hinged between the two pairs of ears 31C/31D and 33C/33D respectively. The cart according to the present embodiment is then completed as shown in FIG. 8. The brazier 10 could then be installed on top of the cart.

To disassemble the cart, the foregoing process is reversed. First, the doors 12 are removed from the ears 31C/31D and 33C/33D and the transom beam 11 is removed from the grooves 31E and 33E. Then, as shown in FIGS. 12~20, the back board 50 is released from the posts 32 and laid flat on top of the bottom board 20. Then the side board 40 is lifted and folded towards the back board 50 and the side board 41 is again lifted and folded towards the side board 40 as well. At last, the four wheels 60 are released from their upright position and folded towards the bottom of the bottom board 20. As a result, the cubic cart has now become a flat object having a regular shape that would be very easy for transportation and storage.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A barbecue device comprising a cart and a brazier positioned on top of said cart, said cart comprising:

a plurality of wheels, each having an axle element with a flexible pin configured inside parallel to the axis of said wheels;

a bottom board having a plurality of seat elements at the corners on the bottom surface of said bottom board, said axle elements of said wheels being pin-joined to said seat elements respectively, each of said seat elements having a hole accepting said flexible pin of said axle element of a wheel so as to lock said wheel in an upright position, said bottom board further having a plurality of joint elements at the corners on the top surface of said bottom board, each of said joint elements having a vertical slot;

a pair of side boards each having two posts along the two lateral sides of said side boards, said side boards being installed along two side edges of said bottom board with said joint elements embedded into said posts respectively, said posts and said joint elements being pin-joined together by a plurality of pins penetrating through said posts and said vertical slots of said joint elements respectively, said side boards capable of being lifted up within the confinement of said vertical slots and folded towards said bottom board;

a back board installed along a back edge of said bottom board and fixed between two opposing posts at the back of said cart;

a transom beam installed across said side boards between two opposing posts at the front of said cart; and at least a door installed in the front of said cart hinged to two ears extended to the front of said cart from the top and bottom ends of a post in the front of said cart.

2. The barbecue device according to claim 1, wherein a trough facing toward the inside of said cart is configured along the bottom section of each of said posts into which a joint element is embedded.

3. A barbecue device comprising a cart and a brazier positioned on top of said cart, said cart comprising:

a plurality of wheels, each having an axle element with a flexible pin configured inside parallel to the axis of said wheels;

a bottom board having a plurality of seat elements at the corners on the bottom surface of said bottom board, said axle elements of said wheels being pin-joined to said seat elements respectively, each of said seat elements having a hole accepting said flexible pin of said axle element of a wheel so as to lock said wheel when said wheel is folded and laid against said bottom board, said bottom board further having a plurality of joint elements at the corners on the top surface of said bottom board, each of said joint elements having a vertical slot;

a pair of side boards each having two posts along the two lateral sides of said side boards, said side boards being installed along two side edges of said bottom board with said joint elements embedded into said posts respectively, said posts and said joint elements being pin-joined together by a plurality of pins penetrating through said posts and said vertical slots of said joint elements respectively, said side boards capable of being lifted up within the confinement of said vertical slots and folded towards said bottom board;

a back board installed along a back edge of said bottom board and fixed between two opposing posts at the back of said cart;

a transom beam installed across said side boards between two opposing posts at the front of said cart; and at least a door installed in the front of said cart hinged to two ears extended to the front of said cart from the top and bottom ends of a post in the front of said cart.

4. The barbecue device according to claim 3, wherein a trough facing toward the inside of said cart is configured along the bottom section of each of said posts into which a joint element is embedded.

* * * * *